(12) United States Patent
Roither et al.

(10) Patent No.: US 8,534,147 B2
(45) Date of Patent: Sep. 17, 2013

(54) ELECTROMOTIVE LINEAR DRIVE

(75) Inventors: Andreas Roither, Enger (DE);
Christian Müller, Steinheim (DE)

(73) Assignee: DewertOkin GmbH, Kirchlengern (DE)

( * ) Notice: Subject to any disclaimer, the term of this patent is extended or adjusted under 35 U.S.C. 154(b) by 854 days.

(21) Appl. No.: 12/517,725

(22) PCT Filed: Nov. 21, 2007

(86) PCT No.: PCT/EP2007/062646
§ 371 (c)(1),
(2), (4) Date: Feb. 19, 2010

(87) PCT Pub. No.: WO2008/068143
PCT Pub. Date: Jun. 12, 2008

(65) Prior Publication Data
US 2010/0139428 A1   Jun. 10, 2010

(30) Foreign Application Priority Data
Dec. 5, 2006   (DE) ..................... 20 2006 018 505 U (51) Int. Cl.
*F16H 25/20* (2006.01)
(52) U.S. Cl.
USPC ........................... 74/89.4; 74/89.33; 74/89.37
(58) Field of Classification Search
USPC .............. 74/89.23, 89.33, 89.34, 89.2–89.32, 74/89.37, 89.4, 606 R
See application file for complete search history.

(56) References Cited

U.S. PATENT DOCUMENTS

| | | | |
|---|---|---|---|
| 6,109,124 A * | 8/2000 | Chen | 74/89.38 |
| 6,322,146 B1 * | 11/2001 | Fisher, Jr. | 297/362.14 |
| 6,344,718 B1 | 2/2002 | Nagai | |
| 2001/0015581 A1 | 8/2001 | Sato | |
| 2004/0093969 A1 * | 5/2004 | Nielsen | 74/89.23 |
| 2005/0011291 A1 | 1/2005 | Nagai | |
| 2005/0109139 A1 | 5/2005 | Nagai | |
| 2008/0134815 A1 * | 6/2008 | Larsen et al. | 74/89.34 |

FOREIGN PATENT DOCUMENTS

| | | |
|---|---|---|
| DE | 4340078 | 7/1994 |
| DE | 10030140 | 1/2001 |
| DE | 102004023243 | 12/2001 |
| DE | 69620594 | 11/2002 |
| DE | 10128945 | 1/2003 |
| DE | 20302142 | 5/2003 |
| DE | 102005007205 | 8/2006 |
| WO | WO 2004/028305 | 4/2004 |
| WO | WO 2004/032684 | 4/2004 |

* cited by examiner

*Primary Examiner* — William C Joyce
*Assistant Examiner* — Terence Boes
(74) *Attorney, Agent, or Firm* — Henry M. Feiereisen LLC (57) ABSTRACT

An electromotive linear drive, in particular for adjusting parts of an item of furniture, having a multi-part housing which is produced from plastic in an injection-molding process and in which are mounted at least one drive train and a block-shaped spindle nut which engages at least partially around the housing and/or at least partially into the housing. The housing is formed from at least two housing parts and has sliding tracks for the spindle nut, wherein at least the thread flights of the spindle are arranged outside the housing. In one preferred embodiment, the housing is arranged below the region of the spindle in relation to the assembled position of the electromotive linear drive. The housing parts forming the housing are of identical or similar, preferably shell-shaped, design in cross section.

18 Claims, 6 Drawing Sheets

ELECTROMOTIVE LINEAR DRIVE

CROSS-REFERENCES TO RELATED APPLICATIONS

This application is the U.S. National Stage of International Application No. PCT/EP2007/062646, filed Nov. 21, 2007, which designated the United States and has been published as International Publication No. WO 20081068143 and which claims the priority of German Patent Application, Serial No. 20 2006 018 505.4, filed Dec. 5, 2006, pursuant to 35 U.S.C. 119(a)-(d).

BACKGROUND OF THE INVENTION

The invention relates to an electromotive linear drive, in particular for adjusting components of an item of furniture, with a multi-part housing made of plastic by injection molding, with at least one drive motor and with at least one rotatably driven spindle, on which a corresponding block-shaped and rotation-locked spindle nut is placed, which at least partially encompasses the housing and/or at least partially engages in the housing.

In a preferred embodiment, the electromotive linear drive is a so-called individual drive with a drive motor and a rotatably driven spindle. The electromotive linear drive is used for adjusting, for example, the back portion or the foot portion of a slatted frame or the back rest and/or the foot portion of an armchair.

In a conventional electromotive linear drive, the spindle is positioned between the two legs of a hollow profile rail section. This hollow profile section is made of steel. The length of the profile rail section can then be varied depending on the application. This results in a large number of different types, so that the drive is no longer advantageous, in particular in an application for adjusting the back rest of an armchair, due to its relatively high cost.

However, different manufacturers, employ identically constructed fittings for adjusting the back rest of an armchair. As a result, a single manufacturer of the aforementioned electromotive linear drive can supply different manufacturers of fittings or chairs, without modifying the electromotive linear drive. Because the described electromotive linear drives for adjusting the fittings of an armchair can be viewed as mass-produced items, the users require these electromotive linear drives to be procured inexpensively.

SUMMARY OF THE INVENTION

It is an object of the invention to construct an electromotive linear drive of the afore-described type with a very simple structure, which is also compact for installation particularly in an armchair, and which additionally can be manufactured inexpensively from a small number of components.

The stated object is attained by making the housing of at least two housing parts with sliding tracks for the spindle nut, wherein at least the threads of the spindle are arranged outside the housing.

Because the housing, preferably the exterior of the housing, now includes sliding tracks for the spindle nut, the housing structure becomes very simple, because no structural measures are required for arranging functional components inside the housing. The function of the housing is essentially limited to the bearing function of the spindle, to the receiving function of the gear and to the guiding function of the spindle nut, so that the housing itself could also be viewed as a guiding body. Because the spindle is now arranged outside the housing, a very compact structure is attained, in particular the overall height is very small at least in the region of the spindle. The drive motor is preferably a gear drive motor, wherein the gear is fixedly or releasably connected with the drive motor. At least the threads which engage with the threads of the spindle nut during travel are arranged outside the housing.

In a first preferred embodiment, the housing extends across the region below the spindle, in relation to the installation position of the linear drive. The conventional rotation speed reduction gear, typically a screw drive which is regarded a standard part, can then be used for driving the spindle.

To simplify installation, the housing may be made of two housing parts having an identical or similar cross-section and which are preferably constructed in form of a shell. In addition, optionally required functional components can be easily installed inside the housing. The shell-like design also provides a relatively high inherent stiffness. Advantageously, the separation plane of the housing or the contact faces is located below the spindle and is oriented vertically in relation to the installation position. The separation plane may extend along the center longitudinal axis of the spindle.

Alternatively, the housing may be made of a box-shaped housing part and a lid forming the second housing part.

According to this embodiment, the lid may be attached to the box-shaped housing in the end region facing the electric motor. The joints between the housing and the lid may be located in a plane oriented at a right angle or parallel to the longitudinal center axis of the threaded screw.

According to another embodiment, the sliding tracks may extend at least over the travel range of the spindle nut and the housing may include projections at the free end facing away from the drive motor for supporting the free end of the drive spindle. The threaded spindle can thereby be supported at both ends, thus preventing an excursion of the threaded spindle due to the load applied during travel of the spindle nut.

In the simplest embodiment, the free end of the threaded spindle may be supported in a bearing seat of the projection of the housing. Alternatively, the free end of the drive spindle may be supported in a slide bearing attached in a bore of the housing projection. The side bearing can advantageously be manufactured from a suitable material, for example a non-ferrous metal. This make possible an advantage material combination of the threaded spindle made of steel and the slide bearing.

In another embodiment, the free end region of the spindle may be formed as a slide bearing, or incorporates a slide bearing connected to the threaded spindle. The aforementioned bearings for supporting the free end of the spindle are preferably implemented as slide bearings, but can also be implemented as anti-friction bearings, whereby loose and/or fixed supports are feasible.

To enable the spindle nut to transfer the forces for adjusting an item of furniture, the spindle nut may be implemented as a hollow body and include a sleeve with an interior thread arranged centrally between the longitudinal edges, with the threads of the sleeve engaging with the threads of the spindle, wherein the individual cavities are formed by stiffening ribs arranged in a lattice pattern and extending in the longitudinal and transverse direction of the spindle nut. This design also saves material.

The spindle nut and the housing can be connected by a simple structure by formfittingly connecting the spindle nut with the housing such that the spindle nut is guided and/or supported for displacement relative to the housing. No additional parts, which would need to be attached, for example, by mechanical connecting elements on one or on both components, are then required for the connection. This formfitting connection is attained by a corresponding design of the spindle nut and the housing. With the two housing parts, a formfitting connection is attained after assembly.

In a particularly simple way, the formfitting connection between the spindle nut and in the housing is formed by parallel and spaced-apart guiding grooves and guiding ribs engaging therewith. The dimensions of the guiding grooves and the guiding ribs are matched to produce a formfitting connection with a defined play.

To simplify assembly, a guiding groove and/or a guiding rib is provided in at least one housing part of the housing, wherein the spindle nut also has guiding ribs and/or guiding grooves.

As already mentioned above, a coupled furniture component is adjusted by a fitting that is coupled to the spindle nut. For connecting the spindle nut with the fitting, which is considered a standard part, connecting plates may be applied on the longitudinal sides of the spindle nut as an input member of an adjustment fitting of the item of furniture. The furniture manufacturer then incurs no additional expenses for equipping the item of furniture with the linear drive. For fixing the linear drives in the provided installation space, a connecting member, preferably in form of a fork head, may be attached to or formed on the side facing away from the spindle nut. This operates as torque support.

Additionally, a cover strip covering the spindle may be provided on the side facing away from the housing. This cover strip has at least two functions, namely it is designed to operate as a screen, because it covers the spindle. Because dust is invariably stirred up inside enclosed spaces, it also operates as a dust protector, making it at least more difficult for dust particles to enter the threads of the spindle and the spindle nut. For obtaining an optimal effect, both sides of the cover strip may project over the spindle.

For a particularly compact, but simple embodiment with respect to the drive for the spindle, the drive motor may be fixedly and/or releasably connected with the rotation speed reducing gear. Additionally, the rotation speed reducing gear may be arranged in a gear housing in which the housing of the linear drive is inserted. Advantageously, a screw drive is selected as a rotation speed reduction gear. Alternatively, the gear housing can be loosely arranged inside the housing of the linear drive. In another alternative embodiment, the gear housing may be clamped when the two housing parts of the housing of the linear drive are mounted, thereby producing a force-transmitting connection. In a modified embodiment, the gear housing may be completely or at least in sections integrally formed with parts of the housing of the electromotive linear drive.

Because in a preferred embodiment, the linear drive is installed in an armchair, the gear housing may include an exterior insulation jacket. This jacket may be fixedly connected with the exterior surface of the gear housing, for example, rubberized. In another embodiment, the jacket may loosely encompass the exterior surfaces of the gear housing, i.e. without being connected. This embodiment may utilize, for example, moss rubber or a similar material.

In a preferred embodiment, the driven member of the rotation speed reduction gear is formed as a rotational body, preferably as the worm wheel of a worm gear. In this embodiment, the rotational body may include a threaded interior bore with threads that engage with the threads of the spindle.

In another embodiment, the rotational body can be fixedly connected with the threaded spindle by formfittingly connecting the spindle with the rotational body with pins extending in the longitudinal direction of the threaded spindle. Advantageously, this connection may be made with two diametrically opposed pins.

According to yet another embodiment, the rotational body is coupled to the spindle with a coupling or with coupling elements.

The two end positions of the spindle nut can be delimited in a conventional manner by limit switches. However, in a simpler structure, the spindle may at the end positions contact stationery limit stops, so that the drive motor can be switched off by an overcurrent relay or a poly-switch fuse, when the motor current exceeds a predetermined value.

Additionally, the two housing parts of the housing can have stiffening ribs extending transversely to the spindle and located on the side facing the spindle nut. Alternatively, the walls can have ribs to attain the greatest possible resistance against twisting, thereby minimizing material consumption.

Mechanical attachment elements cannot be eliminated in the aforementioned linear drive. Accordingly, at least the housing parts of the linear drive are provided with suitably arranged pockets. For example, nuts, screws, threaded inserts and similar parts may be inserted formfittingly and/or for force transmission.

In another embodiment of the electromotive linear drive, the housing may be constructed to have an adjustable size, so that the length of the housing can be changed for small production runs, without incurring cost for changing the injection mold. In addition, the exterior and/or interior side of the housing of the electromotive linear drive may include a tooth system in which connecting elements can engage, so that an additional housing part can be connected with an end cap. The end cap may be formed in several parts and may include a bearing for the free end of the threaded spindle, and at least in sections engage with the tooth system of the housing.

After assembly, the housing of the electromotive linear drive has in addition an interior space for accommodating the electrical wiring of the electrical components, such as motor and limit switches. For securely routing the cables inside the housing, at least one housing part has guiding and holding elements for the electrical conductors, which can be configured as clamping channels or as hooks. The electrical conductors may be at least partially arranged as a fixed track on a printed circuit board and may optionally include additional cabling.

The limit switches are preferably fixedly inserted in at least one housing part. In another embodiment, the position of at least one limit switch may be variable. Continuous adjusting means, such as clamping or screw elements can be used for this purpose. Another embodiment provides formfitting sections in which the respective limits switch can be inserted. These formfitting sections may have steps, so that the respective limits switch can be moved in steps. The travel range of the spindle nut can thus be affected. In another embodiment, at least one limit switch has a kind of bezel in which the switch is inserted. The bezel is in turn inserted in the housing and can be adjusted together with the limit switch either continuously or in steps commensurate with the formfitting sections.

As described in detail above, the housing of the electromotive linear drive is made of a plastic which has large manufacturing tolerances or can incur large deformations under mechanical load. To provide a safe switch-off at the end positions, an actuating element may be associated with at least one limit switch, wherein the actuating element is operated by the spindle nut and operates the limit switch. In another embodiment, the actuating element is formed as a slider which is precisely guided on ribs and/or surfaces of the housing along the travel range of the spindle nut. In this case, the slider has an engagement device and is formfittingly coupled with the spindle nut via the engagement device, so that the engagement device can compensate for dimensional and positional tolerances under mechanical load as well as for manufacturing tolerances.

In another embodiment of the electromotive linear drive, the spindle has a high pitch, so that the spindle appears to be non-self-locking. According to this embodiment, braking means may be provided which are operatively coupled with the threaded spindle or with the motor. The braking means may be implemented as a type of wrap spring and wound around a cylindrical projection, which is coupled to and rotated synchronously with the threaded spindle or the motor shaft, so that the threaded spindle appears self-locking at least in one travel direction of the spindle nut.

BRIEF DESCRIPTION OF THE DRAWING

The invention will now be described in more with reference to the appended drawings.

DETAILED DESCRIPTION OF PREFERRED EMBODIMENTS

The electromotive linear drive 10 illustrated in the Figures is particularly suited for installation in an armchair, for moving the adjustable furniture components with an un-illustrated fitting. The electromotive linear drive 10 is equipped with a drive motor 11 implemented as a DC motor, which is connected with a rotation speed reducing gear which will be described in more detail below. The rotation speed reducing gear drives a spindle 12, with a spindle nut 13 being placed on the spindle 12. The spindle nut 13 is rotation-locked and capable of traveling only in the longitudinal direction of the spindle 12. The linear drive 10 also includes an elongated housing 14 having end regions configured for mounting the rotation speed reducing gear on the side facing the drive motor 11, whereas the free end of the spindle 12 is supported on the opposing end region.

The elongated housing 14 is also constructed with fixed mechanical limit stops disposed between the end regions of the housing 14. To this end, each end region has a step which is formed on a respective end of the guide grooves 15, 16.

Figure 1:
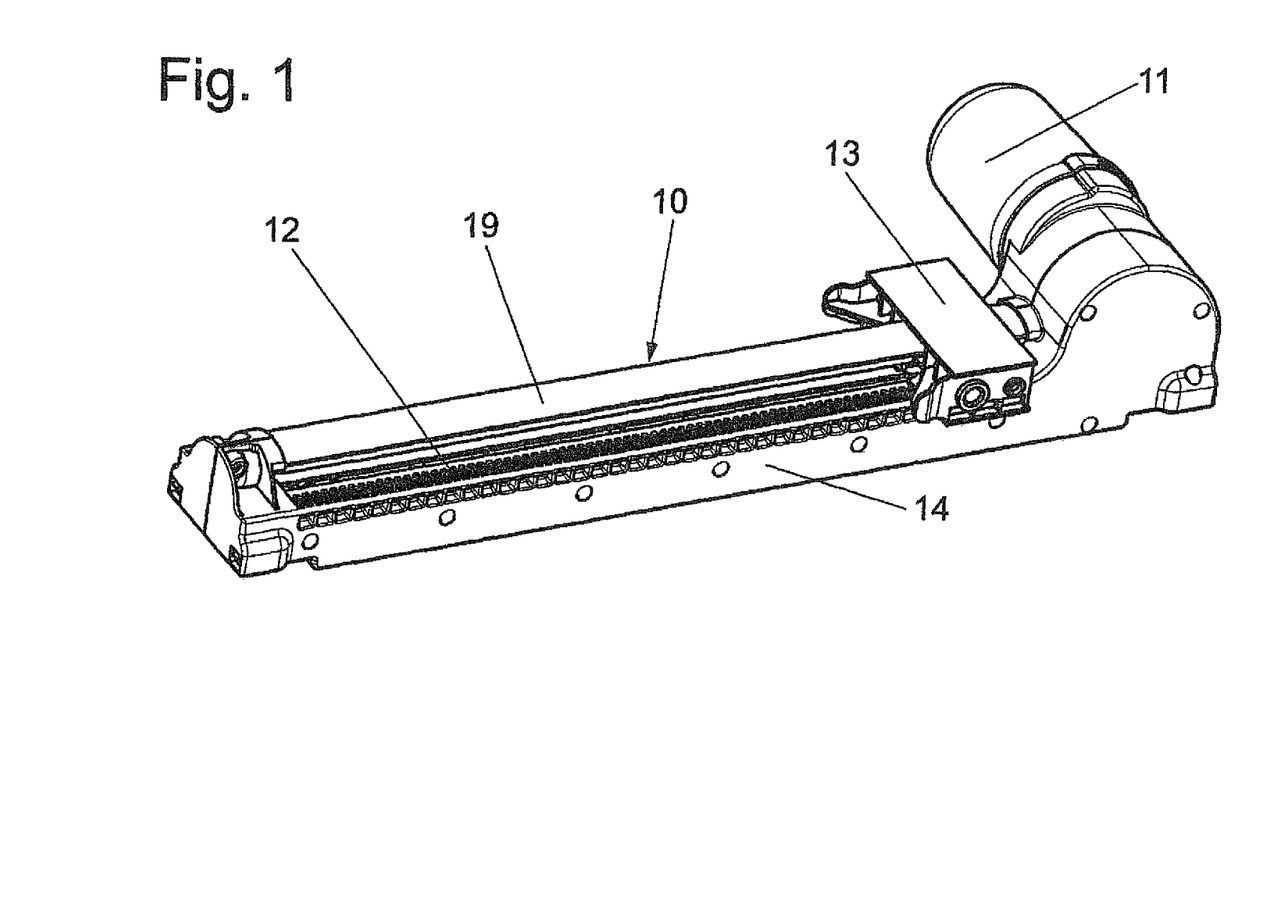
FIG. 1 shows an electromotive linear drive according to the invention in a perspective view.
Figure 2:
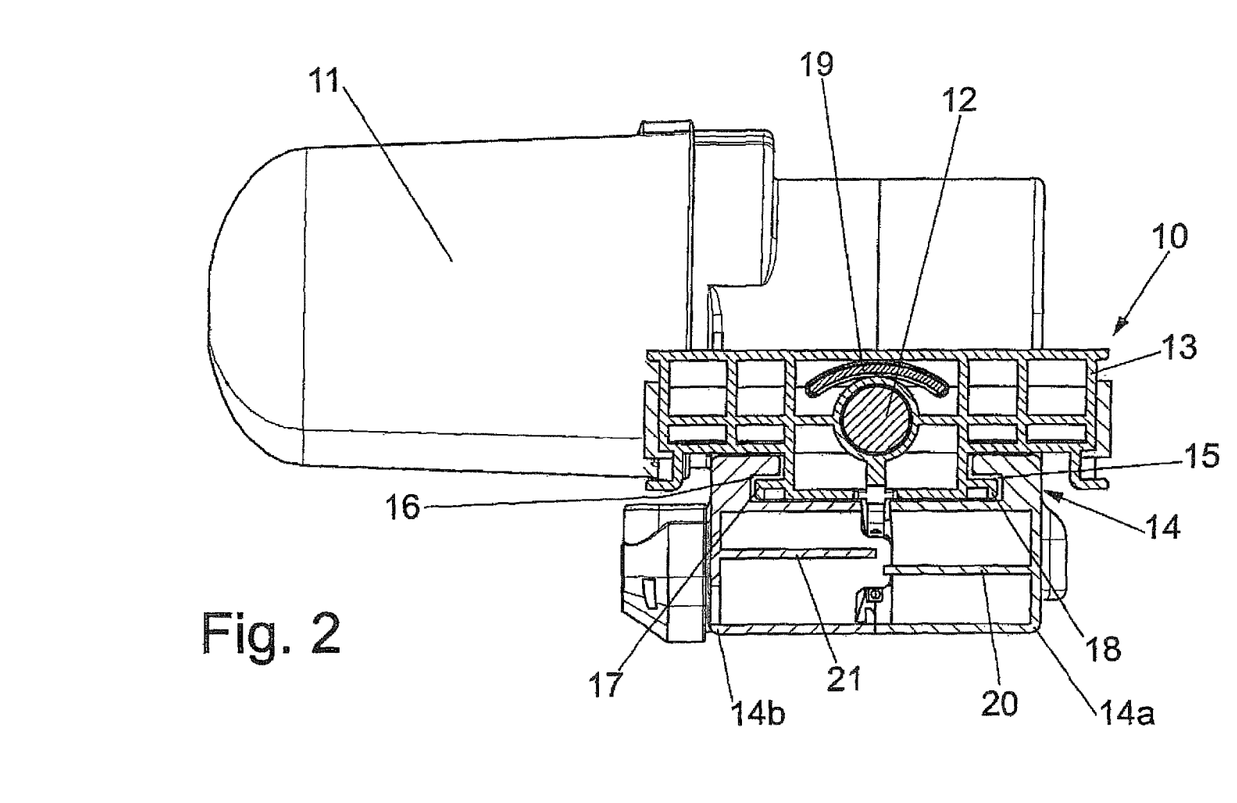
FIG. 2 shows a vertical section perpendicular to the longitudinal direction of the spindle.

As shown in FIG. 2, the housing 14 is constructed in the region associated with the spindle 12 so that the spindle 12 is located outside the housing 14. This Figure also shows that the height of the housing 14 in this region is relatively small and corresponds approximately to the height of the spindle nut 13, so that the overall height is the sum of the height of the housing and the height of the spindle nut. The spindle nut 13 is implemented as a hollow body and provided with a threaded bore located centrally between the longitudinal sides, with the threads of the threaded bore engaging with the threads of the spindle 12.

The individual hollow spaces of the spindle nut 13 are formed by adjoining stiffening ribs arranged in a lattice and extending in the longitudinal and transverse direction of the spindle nut 13.

As clearly shown in FIG. 2, the spindle nut 13 is guided by sliding surfaces of the housing 14. To this end, a guide groove 15, 16 extending in the longitudinal direction of the spindle 12 is provided in each housing part 14a, 14b of housing 14. Guide ribs 17, 18 of the spindle nut 13 engage in the guide grooves 15, 16. Contrary to the illustrated embodiment, the contacting surfaces of the guide grooves 15, 16 and of the guide ribs 17, 18 abut one another. In addition, the upper surfaces of the longitudinal edge region of the housing 14 can also operate as sliding surfaces. This Figure also shows the housing on the side facing the spindle nut 13 being formed as an angled staircase, so that the facing ribs of the housing 14 form guide ribs for the spindle nut 13.

FIG. 2 also shows that the spindle 12 is covered by a cover strip 19 extending in the longitudinal direction and located on the side facing away from the housing 14. This cover strip is fixedly connected with the raised end regions of housing 14. FIG. 2 also shows that the spindle nut has in cross-section a lattice structure. The Figure also shows that each housing part 14a, 14b is provided with a ribbed structure 20, 21 which enhances the rigidity.

Figure 3:
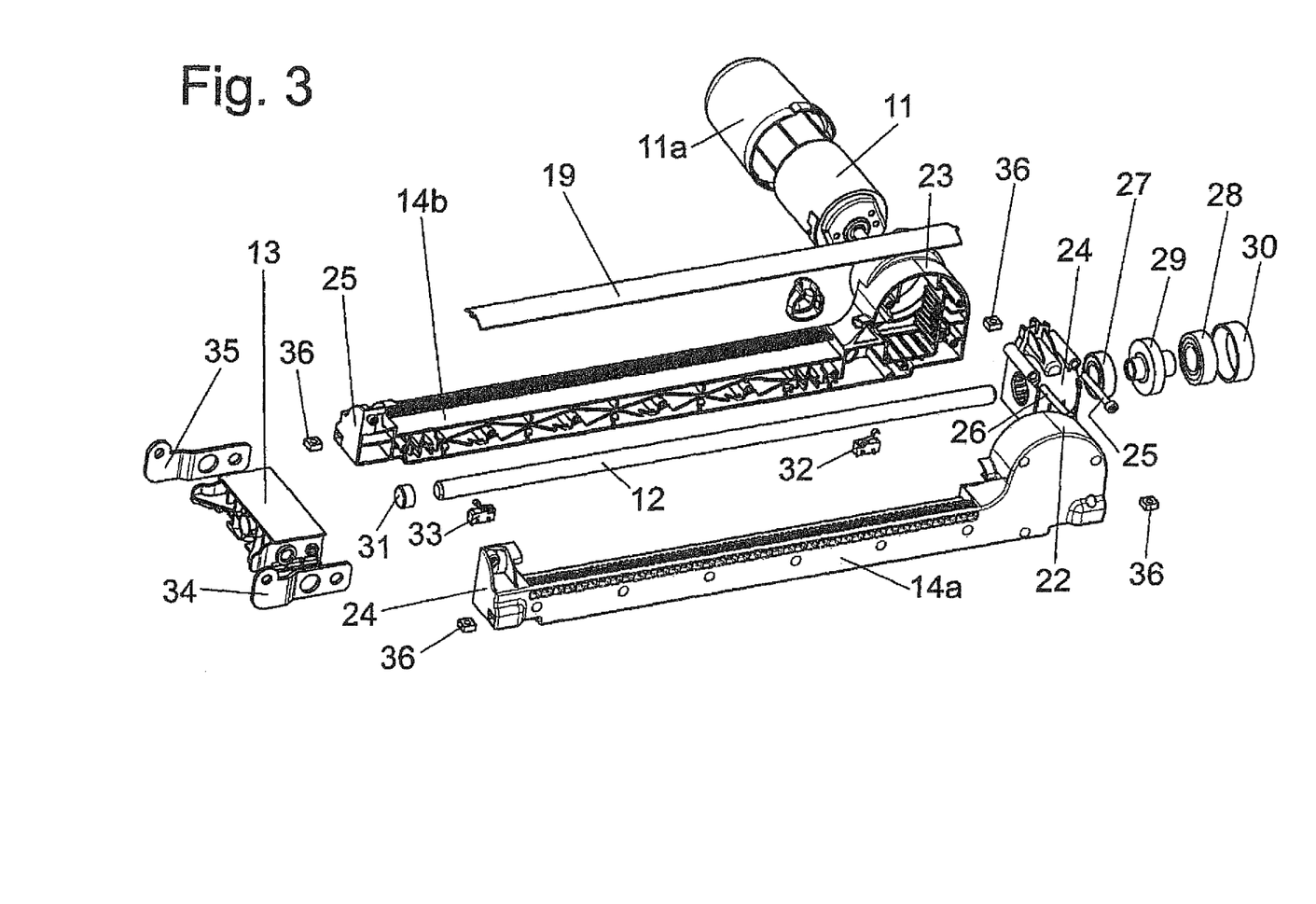
FIG. 3 shows the linear drive of FIG. 1 in an exploded view.

FIG. 3 shows that the drive motor 11 is inserted in a housing 11a. The Figure also shows that the end regions of the housing parts 14a, 14b facing the drive motor 11 have semicircular protrusions and at the opposite end regions protrusions 24, 25. The protrusions 22, 23 are configured for insertion of a gear housing 24. This gear housing can be flush and formfittingly inserted in the protrusions 22, 23 and can also be connected with the drive motor 11 with screws 25, 26 and correspondingly aligned threaded bores. Two slide bearings 27, 28 supporting journals of a worm wheel 29 are inserted at the ends of the gear housing. The worm wheel 29 engages with a worm in a manner not illustrated in detail. The worm and the worm wheel 29 form the rotation speed reduction gear. Other embodiments of gears are also feasible. The reference symbol 30 designates a spacer which fixes the location of the outer slide bearing 28.

The free play of the spindle 12 is in the illustrated exemplary embodiment supported by a slide bearing bushing 31 which is inserted in a corresponding bore of the protrusions 24, 25 and connected with the spindle 12 by a rotation-lock. Contrary to the illustrated embodiment, the free end of the threaded spindle 12 could also be supported directly in a corresponding bore of the protrusions 24, 25.

FIG. 3 also shows that the end positions of the spindle nut 13 are delimited by two limit switches 32, 33, which are mounted inside the housing 14. Instead of limit switches, stationary limit stops which the spindle nut 13 strikes can also be provided. Because this causes an increase of the current dissipated by the drive motor 11, the drive motor 11 can be switched off by an overcurrent relay or by a poly-switch fuse. FIG. 3 also shows that the interior sides of the housing parts 14a have ribs. The same applies also to the upper side facing the spindle nut, which has with a ribbed structure extending transverse to the longitudinal spindle axis 12.

FIG. 3 also shows that two connecting brackets 34, 35 are attached to the longitudinal side of the spindle nut 13, representing the input element of the fitting (not shown in detail). The connecting brackets 34, 35 include bores which are placed on projections of the spindle nut 13. They are prevented by corresponding locking elements from being pulled out. Pockets for placing connecting elements (not shown in detail) are provided inside the housing 14, as indicated by the nuts 35.

Each pocket has a locking section or at least a clamping section, so that the nuts 35 are held captive in the respective pocket. The nuts 35 can be implemented as square nuts. Both the longitudinal and the transverse directions of the pockets are greater than the exterior faces of the nuts 35, allowing them to be moved within certain limits to compensate for tolerances in the hole pattern of the furniture frame. The electromotive linear drive 10 can be attached to a stationary or movable furniture component with the nuts 35.

Figure 4:
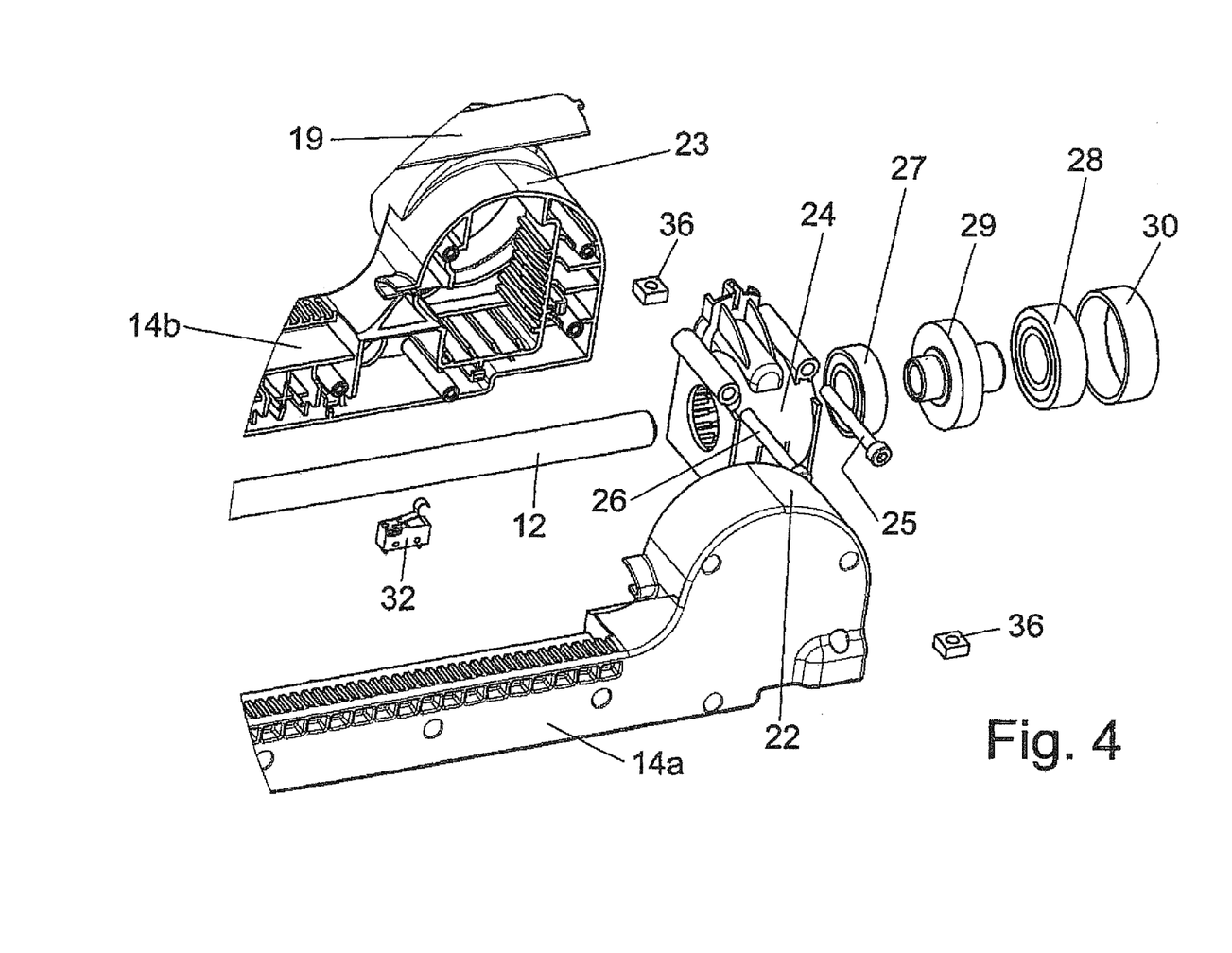
FIG. 4 shows the region of the linear drive associated with the drive motor in an exploded view.
Figure 5:
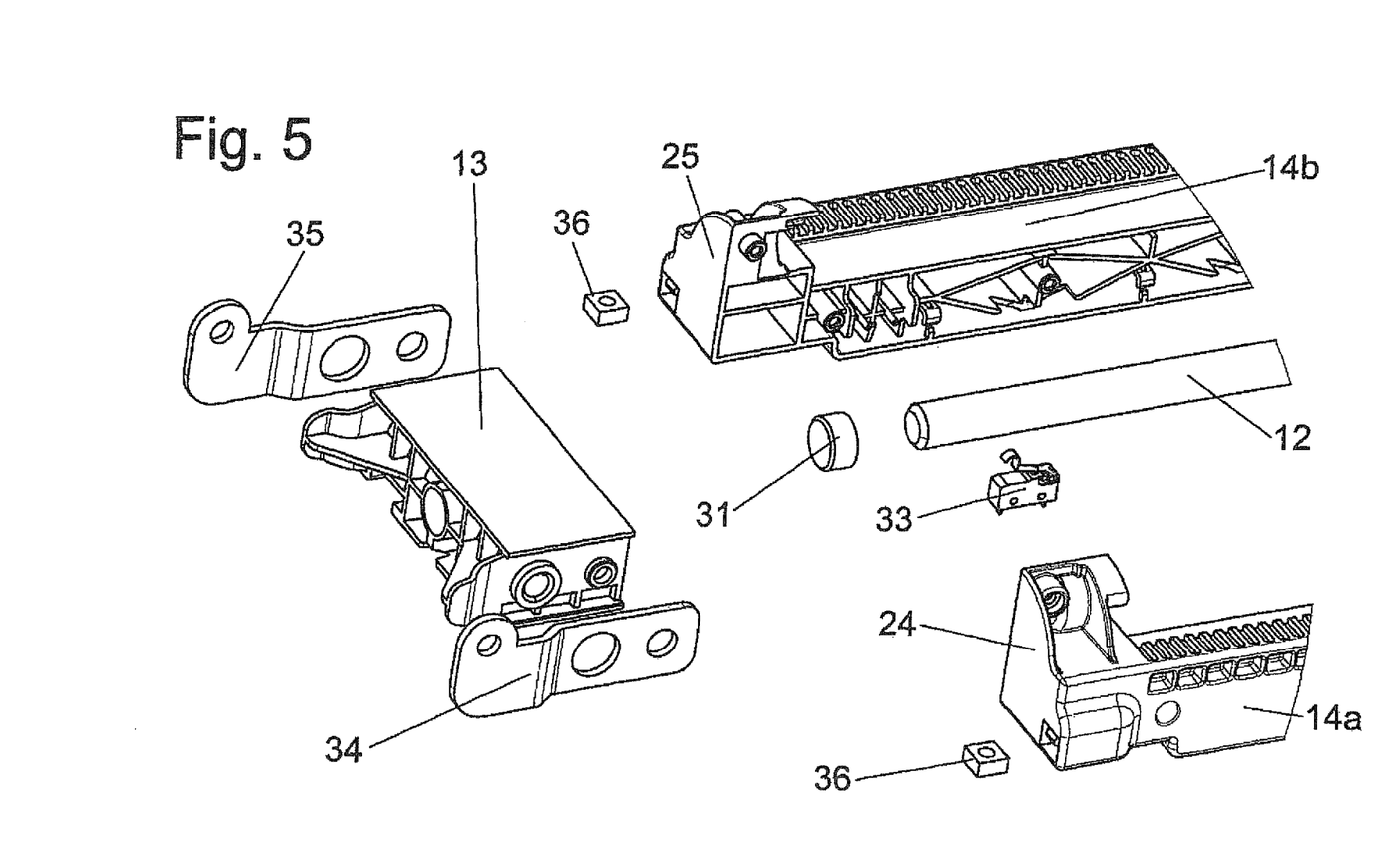
FIG. 5 shows the region of the linear drive facing away from the drive motor in an exploded view.

FIGS. 4 and 5 shows the end regions in an enlarged view compared to FIG. 3.

Figure 6:
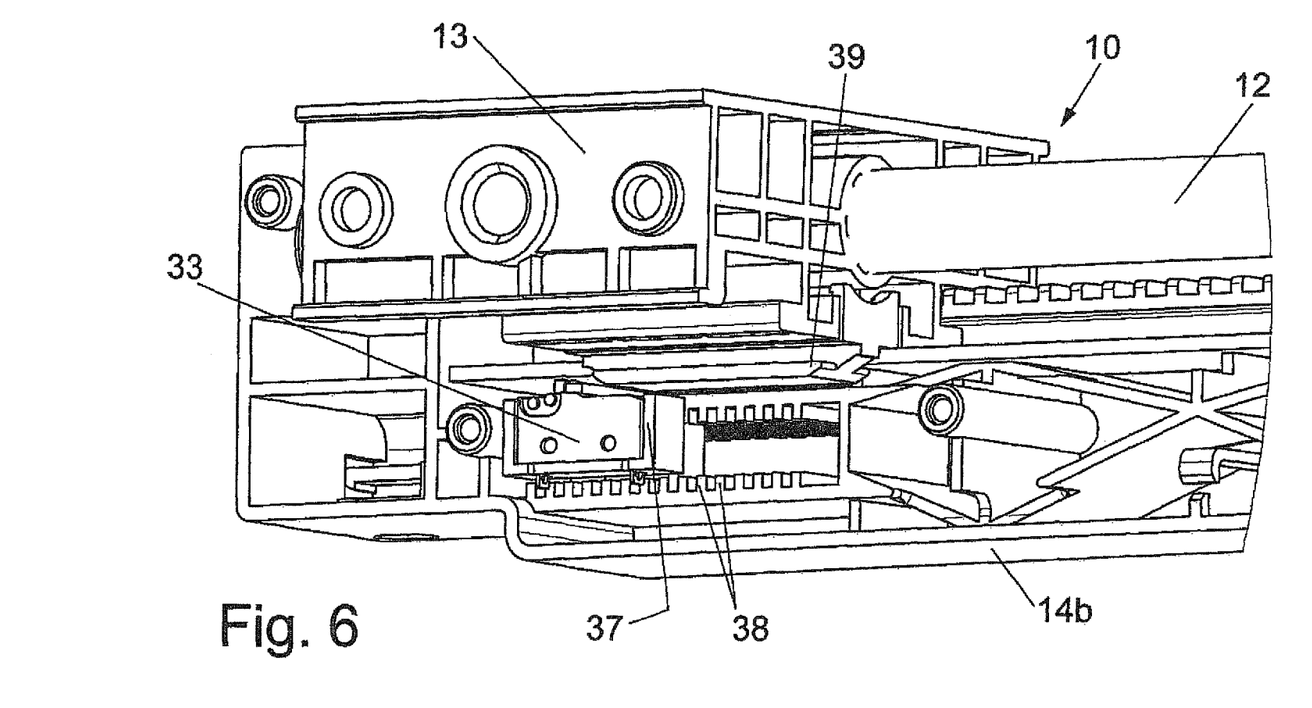
FIG. 6 shows in a perspective view another embodiment of the end region of the linear drive facing away from the drive motor.

FIG. 6 shows a partial view of the electromotive linear drive 10 in a perspective view, whereby the housing part 14*a* has been removed. The housing part 14*b* has in the region of the limit switch 33 a section for attaching a bezel 37, wherein the limit switch 33 is inserted in the frame-like bezel 37. According to this embodiment, the limit switch 33 together with the frame-like bezel 37 can be removed commensurate with the stepped ribs 38 to provide a fine adjustment of the switching point of the limit switch 33. According to FIG. 6, the limit switch 33 is only indirectly operated by the spindle nut 13. An actuating element configured as a slider 39 is movably connected with the spindle nut 33, but fixedly connected in the longitudinal direction of the threaded spindle 12 and coupled with the spindle nut 13 via an unillustrated drive. The drive will not be described in detail, but may include latching ribs and can be latched with the spindle nut 13, preferably in an articulated manner, to facilitate installation.

The slider 39 is guided on the housing parts 14*a*, 14*b* and includes actuating ramps which operate the pusher of the limit switch 33, when the spindle nut 13 reaches its respective end position, interrupting the current flow to the drive motor 11 and hence stopping the electromotive linear drive 10.

An exemplary embodiment for stepped displacement of the limit switch 33 is illustrated in FIG. 6; likewise, the housing 14*b* may also include webs 38 in the region of the limit switch 32 for receiving the frame-like bezel 37.

According to another unillustrated embodiment, the frame-like bezel 37 can be connected with at least one housing part 14*a*, 14*b* for force transmission, for example screwed together.

According to another embodiment, which is also not illustrated, the bezel 37 may include openings or protrusions which match outside sections of the limit switch 32 or 33. The limit switches 32, 33 have then bores or protruding sections, for example of the electrical connections. The electrical connections can pass through the openings, so that the respective limit switch 32, 33 is fixedly connected with a bezel 37. Because the bezel 37 has several openings, the respective limit switch 32, 33 can be positioned at different locations of the bezel, allowing the limit switch 32, 33 to be moved. According to this embodiment, the bezel 38 can also be attached with a rotation-lock and immovable relative to the housing part 14*a*, 14*b*, whereas the limit switch 32 may be arranged relative to the bezel 37 so as to be movable in steps or continuously.

In another embodiment (also not illustrated), each limit switch 32, 33 can be secured in a holder with a wall having at least one slot or a row of holes on the side facing away from the pusher. If the wall has a row of holes, then two brackets can be attached to or formed on the limit switch 32, 33, which are inserted into two holes of the row. No additional locking elements are then required. If the wall has a slot, then the limit switch 32 or 33 can be adjusted continuously. However, an additional lock, for example a clamping screw, must then be provided to prevent the limit switch 32, 33 from moving during operation of the linear drive.

The invention is also directed to an item of furniture, for example a slatted frame, or a bed or an armchair equipped with the afore-described electromotive drive.

What is claimed is:

1. An electromotive linear drive, comprising:
at least one rotatably driven spindle arranged outside a multi-part injection-molded plastic housing and having threads,
a drive motor,
a gear housing with a rotation speed reduction gear having a driven member formed as a rotational body that is formfittingly connected with the spindle,
the plastic housing made of at least two formed housing parts constructed for insertion of the gear housing and defining a separation plane, wherein in relation to an installation position of the electromotive linear drive, the plastic housing extends over a region below the spindle, and wherein the separation plane of the plastic housing extends along a center longitudinal axis of the spindle, and
a block-shaped and rotation-locked spindle nut disposed on the spindle and at least partially encompassing the plastid housing or at least partially engaging in the plastic housing, the plastic housing further including integrally formed sliding tracks for the spindle nut,
wherein the spindle nut is formfittingly connected with the housing parts so as to be guided or supported for displacement relative to the plastic housing, and wherein at least the threads of the spindle are located outside the plastic housing.

2. The electromotive linear drive of claim 1, wherein the sliding tracks extend at least over a travel range of the spindle nut and the housing parts include free ends, wherein the free ends of the housing parts facing away from the drive motor include protrusions which include a bearing seat embodied as a slide bearing bushing fixedly mounted in a bore of the housing parts and supporting a free end of the threaded spindle.

3. The electromotive linear drive of claim 1, wherein the spindle nut is formed as a hollow body and includes a sleeve with interior threads arranged centrally between longitudinal edges, with the interior threads of the sleeve engaging with the threads of the spindle, and individual cavities of the hollow body are formed by stiffening ribs arranged in a lattice pattern and extending in a longitudinal and transverse direction of the spindle nut.

4. The electromotive linear drive of claim 3, wherein the formfitting connection between the spindle nut and in the housing parts is formed by parallel and spaced-apart guiding grooves and corresponding mating guiding ribs.

5. The electromotive linear drive of claim 1, wherein at least one housing part comprises a guiding groove or a guiding rib, and the spindle nut has corresponding guiding ribs or guiding grooves.

6. The electromotive linear drive of claim 5, wherein the guiding grooves or the guiding ribs of the housing and the corresponding guiding ribs or guiding grooves of the spindle nut mesh with the one another in such a way that the housing encompasses at least partially the spindle nut or at least partially engages in the spindle nut.

7. The electromotive linear drive of claim 1, further comprising connecting plates applied on longitudinal sides of the spindle nut and forming an input member of an adjustment fitting.

8. The electromotive linear drive of claim 1, further comprising a cover strip covering the spindle on a side facing away from the plastic housing, with the cover strip protruding over both sides of the spindle.

9. The electromotive linear drive of claim 1, wherein the rotational body comprises a worm wheel.

10. The electromotive linear drive of claim 1, further comprising limit switches or limit stops having a fixed location and delimiting end positions of the spindle.

11. The electromotive linear drive of claim 10, wherein the limit switches include a pusher and are secured in a holder having a wall, wherein at least one slot or a row of holes are disposed on a side of the wall facing away from the pusher.

12. The electromotive linear drive according of claim 1, wherein the plastic housing or the housing parts comprise molded pockets for receiving mounting hardware selected from nuts, threaded inserts, and screws.

13. The electromotive linear drive of claim 1, wherein the plastic housing is constructed to have an adjustable size, wherein an exterior or interior side, or both, of the plastic housing are formed as a tooth system configured to engage with a connecting element allowing an additional housing part to be connected, said additional housing part having an end cap which includes a bearing for a free end of the spindle, wherein the end cap engages at least in sections with the tooth system of the housing.

14. The electromotive linear drive of claim 13, wherein the end cap is formed from several parts.

15. The electromotive linear drive of claim 1, wherein at least one the housing parts has at least one section with a bezel shaped frame having openings or projections in which a limit switch is formfittingly inserted, with the openings or projections matching outer sections of the limit switch.

16. The electromotive linear drive of claim 10, further comprising an actuating element is associated with at least one limit switch, said actuating element formed as a slider and guided on guiding elements of the housing along a travel range of the spindle nut, said actuating element operated by the spindle nut and switching the limit switch.

17. The electromotive linear drive of claim 16, wherein the slider includes an engagement member which is formfittingly coupled with the spindle nut an configured to compensate dimensional and positional tolerances caused by a mechanical load and manufacturing tolerances.

18. The electromotive linear drive of claim 16, wherein the at least one limit switch comprises bores or protruding sections constructed as electrical terminals.

\* \* \* \* \*